United States Patent [19]

Beyda

[11] Patent Number: 5,768,347
[45] Date of Patent: Jun. 16, 1998

[54] METHOD OF PROVIDING LIMITED ACCESS TO PRESERVE PRIVACY WITHIN A MESSAGE SYSTEM

[75] Inventor: William J. Beyda, Cupertino, Calif.

[73] Assignee: Siemens Business Communication Systems, Inc., Santa Clara, Calif.

[21] Appl. No.: 656,018

[22] Filed: May 31, 1996

[51] Int. Cl.⁶ .................................................. H04M 1/64
[52] U.S. Cl. ................... 379/67; 379/76; 379/89
[58] Field of Search ........................... 379/67, 74, 84, 379/88, 89, 93.03, 93.04, 76

[56] References Cited

U.S. PATENT DOCUMENTS

| | | | |
|---|---|---|---|
| 4,761,807 | 8/1988 | Matthews et al. | 379/89 |
| 5,093,854 | 3/1992 | Sucato | 379/88 |
| 5,117,451 | 5/1992 | Ladd et al. | 379/89 |
| 5,247,497 | 9/1993 | Cohn | 379/93.03 |
| 5,291,302 | 3/1994 | Gordon et al. | 358/400 |
| 5,434,908 | 7/1995 | Klein | 379/88 |
| 5,555,291 | 9/1996 | Inniss et al. | 379/72 |
| 5,652,789 | 7/1997 | Miner et al. | 379/88 |

OTHER PUBLICATIONS

Octel User's Reference Manual, Nov. 1994.

*Primary Examiner*—Daniel S. Hunter

[57] ABSTRACT

A method of preserving privacy in an electronic storage-and-retrieval message system includes providing access by designated persons to manipulating interface features for storage/retrieval information related to directing messages, while restricting access to any stored messages. In a voice mail system, the storage/retrieval interface feature includes the greeting that is presented to a calling party. A first access code, such as a password, is assigned to enable access to the interface features, while a second access code is assigned to enable message-retrieval. In the preferred embodiment, changes to a greeting or the like are reported in an audit message that is stored in the user's mailbox. The audit message is automatically generated. The audit message notifies the user of the history of any changes. Changes to a greeting may also be automatically generating by using a stepped sequence of prompts to solicit information relating to the user. For example, in a voice mail system, the sequence may be a series of voice prompts requiring responses by depressing selected telephone keys. The method may be used with message systems that store messages in one or more forms of audio, video, textual and facsimile data.

21 Claims, 3 Drawing Sheets

METHOD OF PROVIDING LIMITED ACCESS TO PRESERVE PRIVACY WITHIN A MESSAGE SYSTEM

TECHNICAL FIELD

The invention relates generally to methods of managing a storage-and-retrieval message system, such as a voice message system, and more particularly to allowing non-intrusive access by others to a limited set of features specific to a user.

BACKGROUND ART

Storage-and-retrieval systems are utilized in a wide variety of applications, particularly within the telecommunications industry. For example, a voice mail system answers a telephone call when a called party is not present or is already handling a call. A greeting message is presented to the calling party, typically inviting the party to leave a message. The message is stored and can then be retrieved at the convenience of the called party.

In addition to voice mail systems, the electronic storage-and-retrieval approach may be used for facsimiles, electronic mail, video mail, or multimedia messages that include combinations of data in the forms of voice, video, facsimile, image and textual data. A facsimile telecommunications system that electronically records fax documents for forwarding the documents to a remote facsimile machine is described in U.S. Pat. No. 5,291,302 to Gordon et al. Recorded fax documents may be forwarded singularly or may be spooled and forwarded in a group. As with voice mail, each user of the multi-user system is assigned a separate mailbox for recording messages intended for that user. Typically, such mailboxes are virtual sites, since messages of more than one user are stored on the same recording device.

For each of the storage-and-retrieval systems, there are a number of features. A message-retrieval feature is utilized by a user to receive stored messages. Within a conventional voice mail system, accessing this feature begins message playback, typically via a telephone station. Within the facsimile system of Gordon et al., the message-retrieval feature causes one or more fax documents to be forwarded to a remote site.

A separate set of features may be referred to as interface features. These features are related to the storage/retrieval information for messages directed to users. In a voice mail system, there is a first interface between a calling party and the system. The storage/retrieval information related to this first interface typically includes a greeting message that identifies the called user and informs the calling party that a message will be recorded after completion of the greeting. The greeting may also notify the calling party that by pressing a particular telephone key, e.g., the star key, the greeting will be truncated and the calling party can immediately proceed with recording a message. Voice mail greetings are often personally recorded, so that the recorded greeting can be easily customized to identify the location of the called party and to provide an estimate as to when the called party will return. After a message from a calling party has been recorded, a second interface is required for the called user to retrieve the stored message. Within the storage-and-retrieval facsimile system, this includes identifying the facsimile machine to which stored fax documents are to be electronically transmitted.

U.S. Pat. No. 5,434,908 to Klein describes a greeting and schedule integration arrangement that is used as an interface feature for a voice mail system. The arrangement provides a personal greeting that is based upon information contained in a user's electronic schedule database that is often already maintained by a user. Thus, the interface feature is merely to connect the voice mail system to the existing database, so that database information may be extracted for automatically generating a greeting. As an example, if a particular user is in a product review meeting each Wednesday morning, this information can be extracted from the user's schedule database to generate a greeting that identifies the user, identifies the location of the user, and identifies the time when the user is likely to return.

While the arrangement of Klein frees a user from the inconvenience of repeatedly changing the greeting message in order to provide an up-to-date personal message, there are concerns in the implementation of the arrangement. If an employee is out of an office because of illness, the information contained within the schedule database will be inaccurate. A user may be unexpectedly absent for a number of days. If a calling party is inaccurately notified that the user will be available to return the telephone call within a short period of time, the calling party may leave an important business message in the mailbox of the absent user, rather than contacting another employee of the same office. One solution to this concern is to allow a supervisory person to retrieve any messages from a mailbox of an absent user. Most storage-and-retrieval systems utilize access codes, such as passwords, to protect against unauthorized access. Initially, only the user and the system administrator may have access to a password. If the supervisory person is to retrieve the messages of the absent user, the password would need to be obtained from the user or the system administrator. This would also allow the supervisory person to change the greeting, so that calling parties would be notified that the user would not be available for at least the remainder of the day.

When the supervisory person (or other designated person) obtains the access code of another user, the person can personalize the voice mail greeting and can retrieve the mail of the user. As a consequence, the privacy of the user may be invaded. This is also true in storage-and-retrieval systems other than voice mail systems. Messages may be retrieved and interface features may be manipulated without the knowledge of the user.

What is needed is a method that allows a designated person, such as a supervisor, to obtain access to system-to-person interface features that are dedicated to another user of a storage-and-retrieval message system, without invading the privacy of the other user. What is also needed is a method that facilitates customizing a greeting of the system.

SUMMARY OF THE INVENTION

A method of preserving privacy in an electronic storage-and-retrieval message system having more than one user comprises steps of providing access by designated persons to the manipulation of first user-specific system features, particularly the manipulation of interface features for storage/retrieval information, while limiting access by a subset of the designated persons to the retrieval of messages stored for a particular user. The set of designated persons that is able to manipulate the interface features includes the particular user for which storage/retrieval information is to be changed. The subset of the designated persons may include only the particular user. In a voice mail storage-and-retrieval system, the interface feature of concern may be the greeting message that is presented to a calling party.

In an embodiment of the storage-and-retrieval message system, each user is assigned a unique mailbox having an

3 associated greeting message. When a greeting message is varied by a person other than the person to whom the mailbox is assigned, an audit message is recorded and stored within the mailbox, with the audit message indicating the person who varied the greeting message and indicating the change to the greeting message.

In another embodiment, the greeting message is formed by the storage-and-retrieval message system using steps that include presenting a stepped sequence of prompts for soliciting information relating to the user for whom the greeting message is to be generated, storing responses to each prompt, automatically generating a greeting message based upon the responses, and storing the generated greeting message for repeated presentation via a telecommunications network.

BEST MODE FOR CARRYING OUT THE INVENTION

Figure 1:
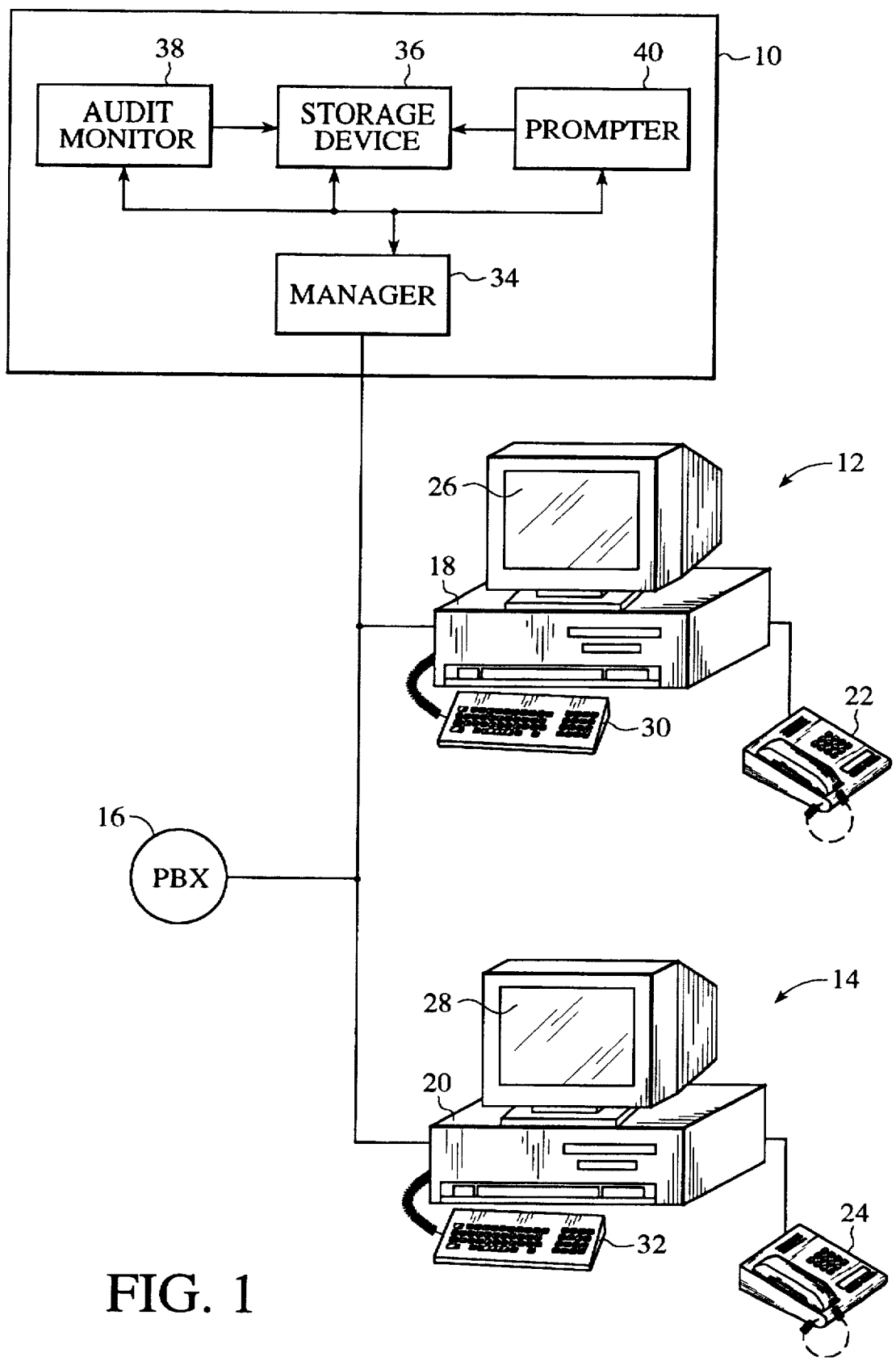
FIG. 1 is a block diagram of a storage-andretrieve system in accordance with the invention.

A method of preserving privacy in an electronic storage-and-retrieval message system having a number of different users includes allowing access by more than one designated person to a limited set of features that are specific to a particular user, but requiring a separate access routine in order to retrieve messages stored for the particular user. In the preferred embodiment, the limited set of features are system interface features for manipulating the storage/retrieval information for directing messages to the particular user. For example, in a voice mail system, the interface features include a greeting that is presented to a calling party. On the other hand, for a facsimile system having storage-and-retrieval capability, the interface feature may be the ability to identify the location and/or time for forwarding fax documents. The method may also be used with multimedia systems for storing messages that include a combination of audio, video, textual and facsimile data.

The method includes assigning a first access code for enabling manipulation of interface features and assigning a second access code for enabling message-retrieval access. Optionally, the system may allow manipulation of the interface features if the second access code is entered for enabling message retrieval. That is, the second access code for a particular user may trigger universal access to all system features associated with that user. In contrast, the first access code is used to provide only limited access. Thus, a designated person other than the particular user, such as the user's supervisor, may non-intrusively change storage/retrieval information if the user is unexpectedly absent. Again referring to the voice mail example, a supervisor can change a personally recorded or automatically generated greeting to notify calling parties that the user will be unavailable for answering messages for the remainder of the work week. However, by using the first access code (e.g., a password), the supervisor will not be able to retrieve any messages stored for the unavailable user.

In the preferred embodiment, the change to the storage/retrieval information is recorded to provide an audit trail. An audit message may be stored in the mailbox of the user, with the audit message identifying both the person that initiated the change and the activity performed by the person. Consequently, the user is made aware of the changes.

In another embodiment, the changes of a greeting for a storage-and-retrieval message system are initiated by presenting a stepped sequence of prompts to the person that is changing the greeting. Preferably, the changes are menu-driven. For example, in a voice mail system, the prompts may be voice prompts via a telephone, with a limited number of possible responses that are selected by depressing the appropriate telephone key. Thus, a template message can be customized by responding to voice prompts to insert time, location and other specific information into the template message.

An advantage of the invention is that both the privacy concerns of the users of a storage-and-retrieval message system and the business concerns are addressed. A designated person can non-intrusively modify system features dedicated to another user in order to reduce the likelihood that an important message will later be stored by a calling party that requires a same-day response to the message. In the voice mail application, the designated person may respond to the stepped sequence of prompts in such a manner that a greeting is automatically generated to notify a calling party that the called user is unavailable for the remainder of the day and then to identify an alternate person for handling business matters.

With reference to FIG. 1, an exemplary storage-and-retrieval system 10 is shown as being connected to a pair of telecommunications stations 12 and 14 that are supported by a private branch exchange (PBX) 16. Each of the stations 12 and 14 includes a personal computer 18 and 20 and a feature phone 22 and 24. The personal computers are connected to conventional monitors 26 and 28 and keyboards 30 and 32.

The telecommunications stations 12 and 14 support multimedia communications, such as video teleconferences. In the preferred embodiment, the storage-and-retrieval system 10 is a message system for storing, retrieving and/or forwarding multimedia messages. However, the invention may be used with message systems that record only one form of audio, video, textual and facsimile forms of data.

Typically, the message system 10 is an integral part of the PBX 16, but this is not critical. The message system includes a manager component 34 that functions as a processing unit for coordinating operations. The message system includes a storage device 36, an audit monitor 38 and a prompter 40. The storage device is a conventional component for storing messages that are to be retrieved or forwarded at the convenience of a user. For example, if the user of station 12 is not available at the time that an incoming call arrives, the calling party may record a message at the conventional storage device 36. While not critical, each user may have a separate virtual mailbox at storage device 36 for recording facsimile documents, voice mail, electronic mail or the like. As an alternative to the structure of FIG. 1, messages may be stored at a remote site, such as a central telecommunications office. Still another alternative would be one in which the messages are stored at the individual personal computers 18 and 20 of the users of stations 12 and 14.

As previously noted, there are sometimes conflicting concerns related to operation of message systems. In a corporate environment, supervisory personnel will at times find it important to access certain features that are dedicated to a particular user. For example, if the user of station 12 must take an unexpected absence for a number of days, supervisory personnel may consider it necessary to create a system-to-calling party greeting that notifies the calling party of the absence. Such a greeting will reduce the likelihood that the calling party will leave an important business message that requires an immediate response. On the other hand, there is a concern for the privacy of the particular user. Conventionally, access to the system features that allow the greeting to be changed is directly tied to access to stored messages.

The conflicting concerns can be balanced by providing a system that separates the access to interface features that include greeting modification from access to stored messages. The interface features are related to both the interface of the message system with a calling party (e.g., the greeting message) and the interface of the system with a person or another system during message retrieval (e.g., the phone number of a fax machine to which stored facsimile documents are to be forwarded).

Figure 2:
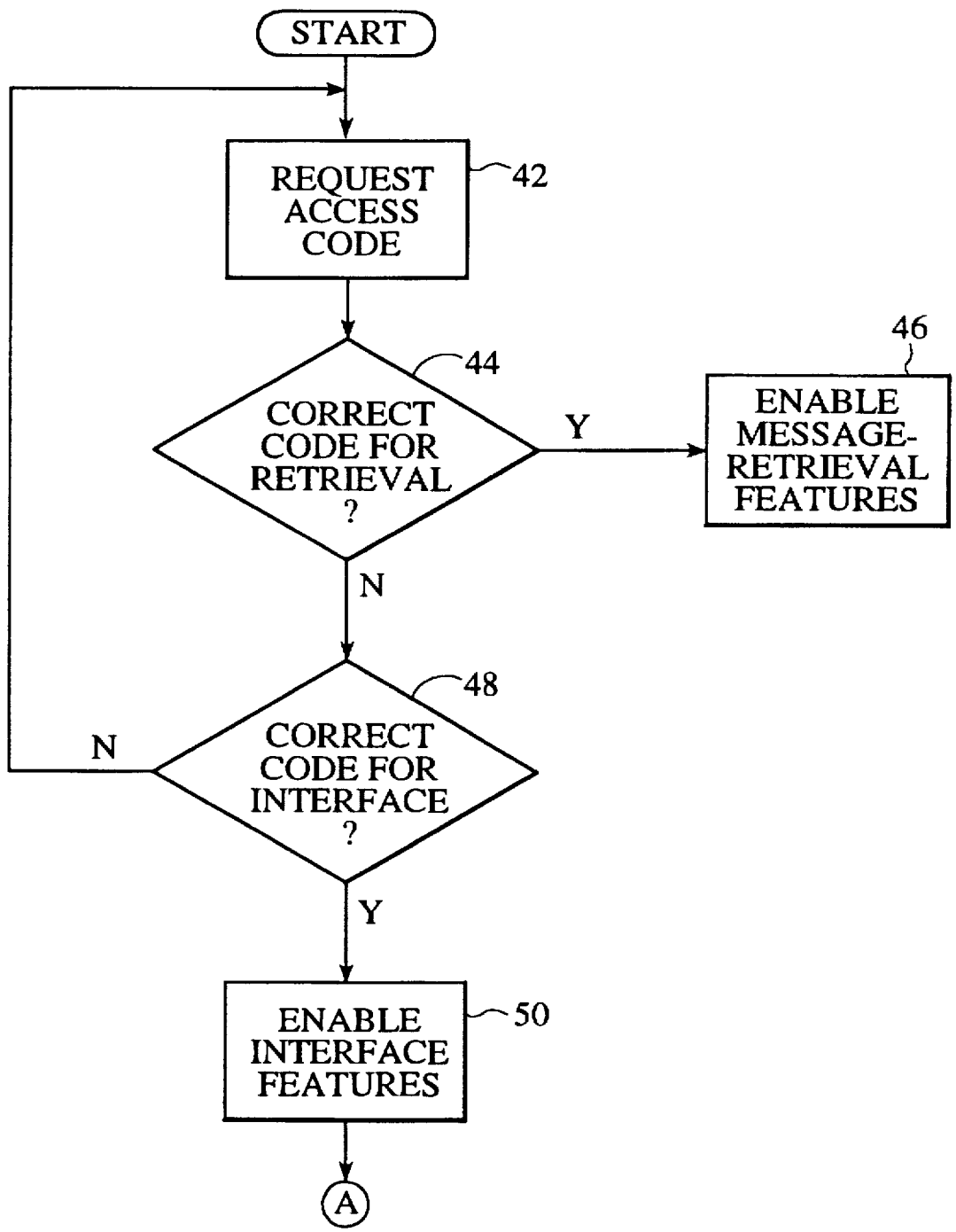
FIG. 2 is a flow chart of steps for providing access to features of the system of FIG. 1, with more than one access code in order to allow non-intrusive changes to system interface features.

At step 42, the message system 10 requests input of an access code. The use of access codes is known in the art, since such access codes are conventionally used to permit messages to be retrieved by only designated persons. However, the method of FIG. 2 is able to distinguish between different access codes. The codes may be audibly communicated or may be in the form of a particular sequence of telephone key depressions. Other means of inputting a code may also be utilized.

In step 44, the system determines whether the code that has been input is the correct code to enable message retrieval. If the input matches the message-retrieval code, the required features are enabled at step 46. The operations at step 46 are conventional and are well known in the art.

If step 44 does not recognize a match, the access code that is input in response to step 42 is compared to an interface access code at step 48. For occasions in which no match is found in either of steps 44 or 48, the process returns to a request for an access code at step 42. This allows a person a second attempt at correctly inputting the desired code. However, there may be a preselected limit to the number of retries at inputting the code.

If at step 48 the code that is input in response to step 42 matches an interface access code, the interface features of the message system 10 are enabled at step 50. As previously noted, the features that are enabled will depend upon a number of factors, particularly the type of message-and-retrieval system that is involved. For example, the message system may be circuitry in a facsimile machine that stores and forwards documents. In this example, the interface feature that is made modifiable at step 50 is one that allows reprogramming of the designation of the facsimile machine to which messages are to be forwarded. Alternatively, if the facsimile message system is programmed to automatically generate a message-received greeting upon recording a fax document to be forwarded, the interface features that are enabled allow modification of the message-received greeting.

In the preferred embodiment, the enablement steps 46 and 50 are isolated. Access to manipulation of the interface features at step 50 does not allow a person to retrieve messages that are stored for a particular user. However, the system may optionally allow manipulation of the interface features if the correct access code has been entered for enabling message retrieval at step 46. That is, the access code for allowing a person to retrieve messages of a particular user may trigger universal access to all system features associated with that user.

Referring now to a voice mail system, a supervisor of an unavailable user may simply implement a generic greeting. The generic greeting may state that the user will be unavailable for the day and/or may identify an alternate person to whom business-related issues may be directed. However, in the preferred embodiment, greeting messages for the storage-and-retrieval system 10 are automatically generated based upon responses to a stepped sequence of prompts for soliciting information related to the user. The stepped sequence is presented whether the respondent is the user or some other designated person. Again referring to the preferred embodiment, an audit message is recorded in the mailbox of the user if the person making the changes is not the user. The audit message identifies the person and the changes.

Figure 3:
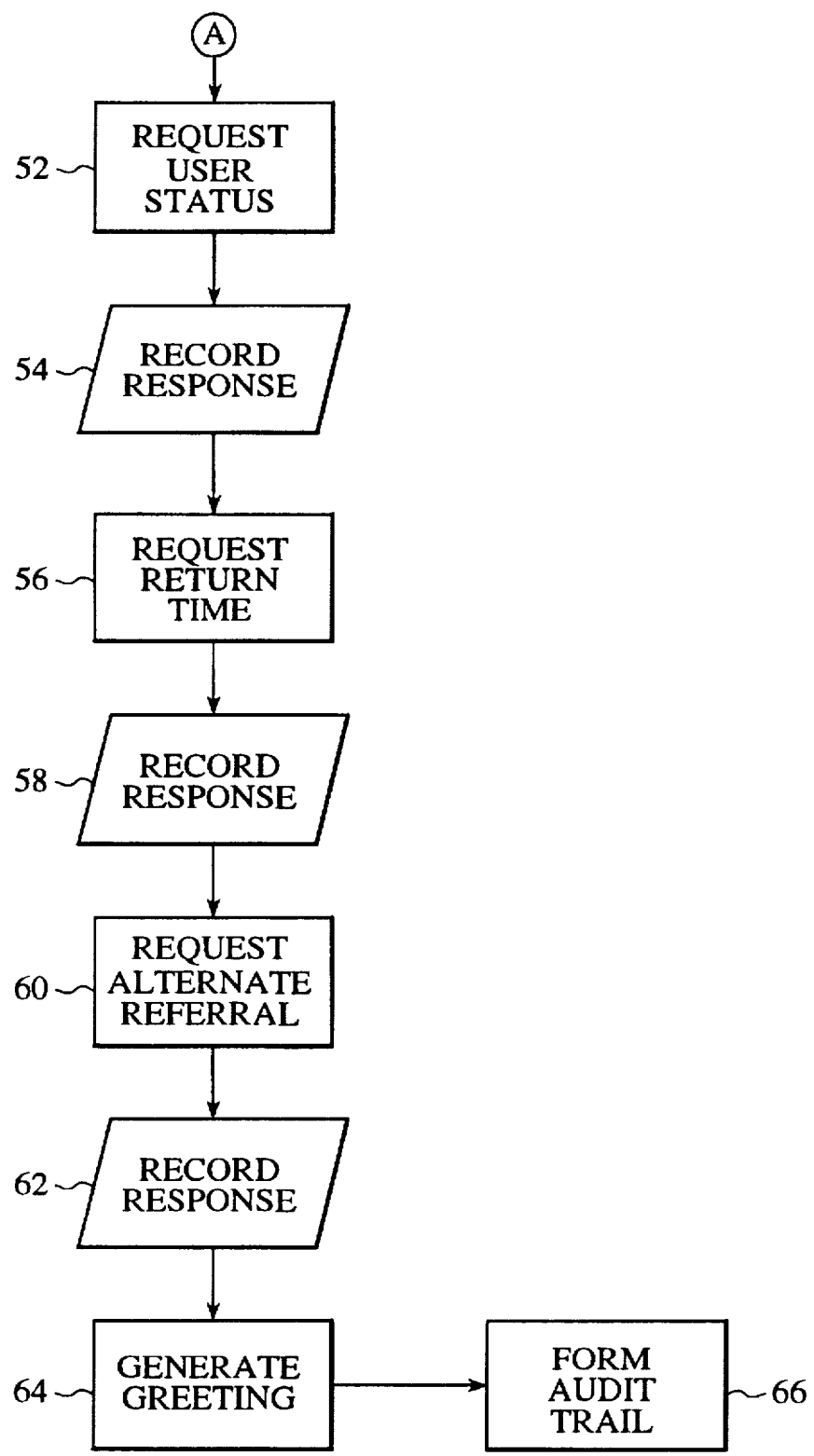
FIG. 3 is a flow chart of steps for providing a sequence of prompts for modifying a greeting message of the system of FIG. 1.

FIG. 3 is one embodiment of a method of customizing a greeting based upon common situations and upon responses to prompts. The prompt-and-response process is menu-driven and may be provided by a voice mail vendor as prerecorded options. Alternatively, the menu may be customized for an entire site by a system administrator.

In the exemplary sequence of prompts of FIG. 3, either the user or another designated person wishes to manipulate interface features to create a greeting that notifies a calling party of the absence of the user. At step 52, the voice or computer prompt requests the user's status. For example, if a voice mail system having Jim Jones at mailbox 2123 is to generate a greeting for that mailbox, the system may prompt, "You have asked to change a greeting. To indicate the mailbox owner is out of the office, push 1. In the office, push 2." The response is recorded at step 54. The recording may be confirmed via voice or computer prompt, e.g., "You have indicated the mailbox owner is out of the office."

At step 56 of the exemplary sequence of prompts, a request is made for an estimate as to the return of the user. This may be a multi step process. A first step is used to identify a month, e.g., "Please enter the number of the month when the mailbox owner will be returning, followed by the pound sign." If the user is expected to return in October, the designated person presses "10#." The system then prompts, "Please enter the date when the mailbox owner will be returning, followed by the pound sign." The designated person may then push "25#." The responses are recorded at step 58 and the system may affirm, "You have indicated that the mailbox owner is returning on October 25."

In step 60, the system requests the identification of an alternate person to whom business issues may be directed. For example, the system may prompt, "Please push the pound sign to accept the mailbox owner's normal referral extension, John Smith at extension 2345, or enter a new extension for this absence only, followed by the pound sign. If you do not wish a referral extension be provided, push the star key." The response will be recorded at step 62.

Based upon the responses at steps 54, 58 and 62, a greeting is generated at step 64. While not indicated in FIG. 3, the system may allow the transfer to the alternate referral to be automatic. An appropriate prompt is, "To have the voice mail system play the greeting and accept messages, push the pound sign. To play the greeting and transfer callers to the referral extension, push the star key." If the designated person depresses the pound sign, the voice mail system will respond, "Here is the new greeting for this mailbox. 'You have reached the voice mailbox of Jim Jones at extension 2123 at Company XYZ. This person is out of the office and is returning on October 25. You may leave a message at the tone, or if you push 0 followed by the pound key, you will be transferred to John Smith at extension 2345, who is taking calls for Jim Jones in his absence. BEEP.'"

If the greeting is changed by a person other than the mailbox owner, an audit trail is formed at step 66. In the preferred embodiment, the audit trail includes the identification of the designated person, includes the time at which the change was made, and includes identification of the change. However, it is not critical to include all three of these elements. The audit trail is a message that is left in the mailbox of the user, so that the user is made aware of the changes. As an example, an audit message in a mailbox may be, "Your mailbox greeting was changed on October 22 by Bob Butler at extension 2156. The greeting was changed to the following: . . . "

Utilization of an audit message may be applied to any storage-and-retrieval system. For example, in a facsimile application in which fax documents are stored and then forwarded to another facsimile machine, the audit message may be in the form of a fax document that is immediately generated at the facsimile machine which is to execute the forwarding operations. Alternatively, the audit message may be a stored message within memory of the forwarding facsimile machine, with the stored message being retrievable by the "mailbox" owner. A third alternative would be to forward the audit message in the same manner as other fax documents that are forwarded to the designated remote facsimile machine.

In the example of FIG. 3, the step 64 of generating the greeting customizes a template greeting according to the responses to the prompts. This assumes that the voice mail system has the capability to prerecord mailbox-specific header information, such as the user's name and extension and a referral name and extension. In addition, the system must allow prerecorded system-wide information, such as the company name. The prerecorded information is then "pieced together" with the information acquired in response to the prompts presented to the designated person. Further customization of the template is possible by providing additional choices. For example, the "out of the office" choice that was described above may be replaced with "out sick," "on vacation," "in a class," "in a meeting," etc. Other variations are also possible. The prompt-and-response sequence may be implemented in a system that allows the responding person to personally dictate the insertions into the template, so that there is no limit to the number of possible responses to the prompts. Finally, in some applications of the invention of FIGS. 1–3, an entire greeting is recorded in the voice of the user or a designated person, e.g., the supervisor of the user.

I claim:

1. A method of preserving privacy in an electronic storage-and-retrieval message system that is accessible from a plurality of access-enabling devices having a plurality of users comprising steps of:

on a user-by-user basis, providing access by designated persons to manipulation of first system features that are specific to a particular user, including providing access to manipulating interface features for storage/retrieval information relating to directing messages to said particular user but excluding enabling message retrieval from said system, said designated persons including said particular user and at least one other person, wherein said step of providing access by designated persons includes a step of providing access via any one of said plurality of access-enabling devices; and for each of said particular users, providing access by a subset of said designated persons to retrieval of messages directed to said each particular user, said subset including said each particular user, thereby enabling message-retrieval access by said each particular user to whom messages are directed while restricting such message-retrieval access to fewer than all of said designated persons.

2. The method of claim 1 wherein for each particular user the method further comprises a step of assigning a first access code required to enable manipulation of said first system features and assigning a second access code required to enable said message-retrieval access, wherein said step of providing access to manipulation of said first system features includes identifying said first access code to said designated persons and wherein said step of providing access to retrieval of messages includes identifying said second access code to said particular user.

3. The method of claim 1 wherein said step of providing access by designated persons is a step that includes enabling said designated persons to change a greeting message of a voice mail storage-and-retrieval system.

4. The method of claim 1 further comprising steps of assigning a different electronic mailbox to each of said users and storing messages in said mailboxes based upon to whom said messages are directed, said method further comprising generating a message in said mailbox of a user each time that a designated person other than said user manipulates said interface features relating to said user.

5. The method of claim 4 wherein said step of generating said message includes identifying said designated person and identifying the manipulation of said interface features.

6. The method of claim 1 wherein said system is a telecommunications system and said method includes steps of recording and transmitting said messages in forms of at least one of audio, video, textual and facsimile data.

7. The method of claim 6 wherein for each user said telecommunications system has an answering-and-greeting mode that is initiated upon receiving an incoming call directed to said user, said step of providing access by said designated persons to manipulation of said first system features being a step of limiting access to changing execution within said answering-and-greeting mode.

8. The method of claim 1 wherein said step of providing access to manipulating interface features includes presenting a stepped sequence of message variables for generating a greeting message available for presentation prior to recording a message for said particular user.

9. The method of claim 8 further comprising a step of automatically generating a greeting message based upon responses to said stepped sequence.

10. The method of claim 1 wherein said step of providing access to manipulating interface features includes initiating recording of an audio message of one of said designated persons to form a greeting message.

11. In a storage-and-retrieval message system having a plurality of users, a method comprising steps of:

assigning a unique mailbox to each user such that each mailbox is associated with one of said users; and for each of said mailboxes, following substeps of:

(1) providing a greeting mode that is implemented when said mailbox is addressed, said greeting mode being associated with a greeting message;

(2) selectively enabling variations of said greeting message by at least one person other than said user associated with said mailbox; and (3) recording an audit message in said mailbox when said greeting message is varied, including recording information indicative of said person that varied said greeting message and information indicative of variation of said greeting message.

12. The method of claim 11 wherein said substep of selectively enabling variations of said greeting message includes enabling an audio recording of said person other than said user.

13. The method of claim 11 further comprising a step of recording messages including said audit message in each mailbox in a form of at least one of audio, video, textual and facsimile data.

14. The method of claim 11 wherein said step of assigning mailboxes is a step of assigning voice mailboxes of a telecommunications system.

15. The method of claim 11 wherein said substep of selectively enabling variations of said greeting messages includes presenting a stepped sequence of message variables to said person, said method further comprising a step of generating a completed greeting message that is based upon a plurality of inputs by said person in response to said stepped sequence.

16. The method of claim 11 wherein said substep of selectively enabling variations of said greeting message includes blocking access by persons to messages stored in said mailbox if said person is other than said user who is associated with said mailbox.

17. A method of forming a greeting message for a storage-and-retrieval message system comprising steps of:

presenting a stepped sequence of prompts for soliciting information relating to a user for whom a greeting message is to be generated;

storing responses to each prompt of said stepped sequence;

automatically generating said greeting message based upon said responses;

storing said greeting message for repeated presentation via a telecommunications network; and storing an audit message indicative of greeting message changes when said sequence of prompts is responded to by a person other than said user.

18. The method of claim 17 wherein said step of automatically generating said greeting message is a step of customizing a template message based upon said responses.

19. The method of claim 17 further comprising a step of limiting access by said person such that said access by said person to stored messages directed to said user is disabled.

20. The method of claim 17 wherein said message system is a voice mail system and wherein said step of presenting said stepped sequence is a step of generating voice prompts via a telephone line.

21. The method of claim 20 wherein said step of presenting said stepped sequence includes prompts for depressing selected telephone keys as responses to said solicitation of information.

* * * * *